US012693847B2

(12) United States Patent
Kattimani et al.

(10) Patent No.: US 12,693,847 B2
(45) Date of Patent: Jul. 28, 2026

(54) ARTIFICIAL INTELLIGENCE AND TRACING-ENABLED AUTOMATED HEALING FOR MOBILE DEVICE DEPLOYMENTS

(71) Applicant: INTUIT INC., Mountain View, CA (US)

(72) Inventors: Muralidhar Kattimani, San Ramon, CA (US); Mayuresh Sanjay Raut, Milpitas, CA (US); Omer Muhammed, Concord, CA (US)

(73) Assignee: INTUIT INC., Mountain View, CA (US)

( * ) Notice: Subject to any disclaimer, the term of this patent is extended or adjusted under 35 U.S.C. 154(b) by 396 days.

(21) Appl. No.: 18/478,227

(22) Filed: Sep. 29, 2023

(65) Prior Publication Data

US 2025/0110723 A1　　Apr. 3, 2025

(51) Int. Cl.
*G06F 9/44*　　(2018.01)
*G06F 8/65*　　(2018.01)
*G06F 11/07*　　(2006.01)
*G06F 11/3604*　　(2025.01)

(52) U.S. Cl.
CPC ............ *G06F 8/65* (2013.01); *G06F 11/0766* (2013.01); *G06F 11/3616* (2013.01)

(58) Field of Classification Search
CPC ............... G06F 21/577; G06F 11/0751; G06F 11/3616; G06F 11/0766; G06F 9/453; G06F 8/65
See application file for complete search history.

(56) References Cited

U.S. PATENT DOCUMENTS 12,430,165 B2 * 9/2025 Wang ................... G06F 11/3423
2019/0132351 A1 * 5/2019 Linde .................... G06F 21/577

* cited by examiner

*Primary Examiner* — Chuck O Kendall
(74) *Attorney, Agent, or Firm* — Patterson + Sheridan, LLP

(57) ABSTRACT

Certain aspects of the present disclosure provide techniques for automatically healing a product flow for a mobile application. The techniques include an auto-healer capable of performing one or more actions, such as healing a product flow or generating an alert for a product flow, in response to determining an issue with the health status of the product flow. The health status can be determined from metrics included in a signal sent from mobile devices executing a mobile application including the product flow and hosted on a mobile application distribution platform. The metrics may be collected at flags or checkpoints in the mobile application and sent to a metrics server. In some cases, artificial intelligence may be used to analyze the metrics to determine health status issues or anomalies.

20 Claims, 5 Drawing Sheets

410

Receive Product Flow at Auto-Healer

420

Validate Product Flow by Healing Module

430

Receive Signal from Mobile Device(s) Executing the Product Flow

440

Determine Health Status of Product Flow Based on Metrics

450

Perform Action(s) to Heal Product Flow

460

Receive Signal from Mobile Device(s) Executing the Healed Product Flow

470

Verify Healed Product Flow Status

480

Determine Whether to Perform Additional Action(s) based on Healed Product Flow Status

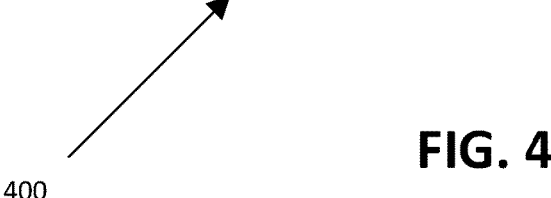

ARTIFICIAL INTELLIGENCE AND TRACING-ENABLED AUTOMATED HEALING FOR MOBILE DEVICE DEPLOYMENTS

INTRODUCTION

Aspects of the present disclosure relate to apparatuses, systems, and methods for automatically healing mobile application deployments on mobile devices using stability rules and/or artificial intelligence to validate product flow health.

BACKGROUND

Mobile applications have become increasingly popular and have enjoyed widespread adoption due to their convenience, ease of access, and flexibility of use. Developers of all kinds can generate mobile applications and make them available to the public for download to a customer's mobile device. However, the largest distribution platforms available, which reach the most potential customers, usually require a lengthy submission and approval process. Often, this process must be completed even for updates or patches to an existing application.

As a result, mobile applications generally lack roll back capabilities. A user may experience an issue with an updated or patched version of a software application for which no issue was experienced for a previous version. However, traditional roll back techniques are unfeasible due to the lengthy submission and approval process. Resolving such an issue instead generally requires a manual system where the product owner must discover or be notified of the issue and then manually solve the issue. Such manual intervention required by current systems is error prone and may lead to significant delays and downtime.

Accordingly, techniques are needed to automatically heal issues in a distributed mobile application and/or to enable roll back functionality for a product flow for a mobile application without requiring a lengthy submission and approval process.

BRIEF SUMMARY

Certain embodiments provide a computer-implemented method for artificial intelligence (AI) and tracing-enabled automated healing for distributed mobile deployments. For example, a method of healing a product flow for a mobile application is disclosed herein, comprising: receiving a product flow at a healing module; receiving, at the healing module, a signal from one or more user devices executing a mobile application including the product flow; determining, by the healing module, a health status of the product flow from the signal; and in response to the health status of the product flow indicating a problem with a component of the mobile application, performing one or more actions by the healing module to heal the product flow.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates an example method for automated healing for distributed mobile application deployments, according to embodiments of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
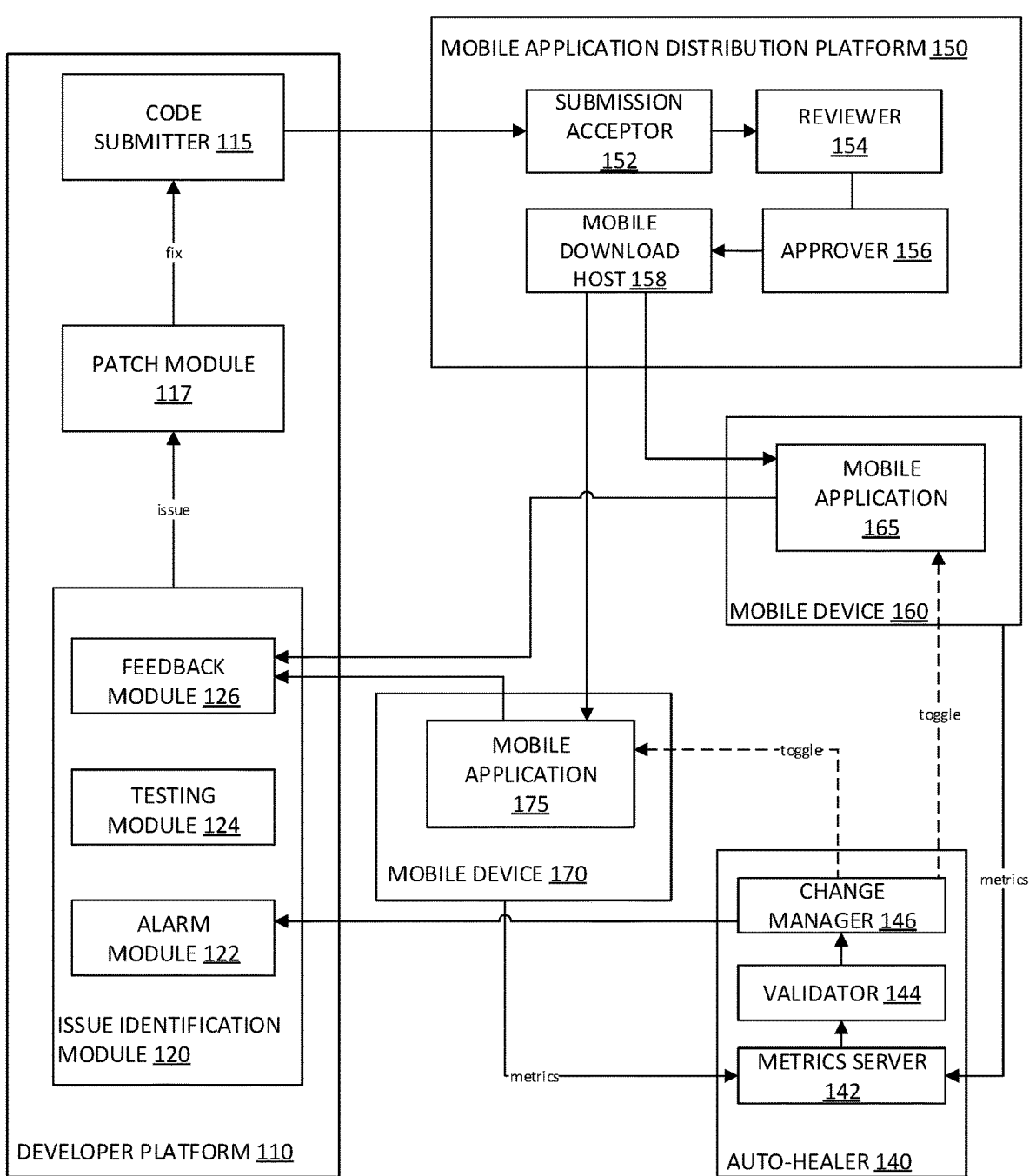
FIG. 1 illustrates a computing environment for automated healing for distributed mobile application deployments in which embodiments of the present disclosure can be performed, according to embodiments of the present disclosure.

Unlike local services, web-based services, or other server side software deployments, mobile applications generally lack rollback capability after being published for distribution on a centralized platform such as the Apple® App Store® or Google® Play Store®. Rather, due in part to the lengthy submission, review, and approval processes of such platforms, there may be a substantial delay in addressing any issues with published code. If any issue is discovered in the released application, there is generally no equivalent of rolling back to the previous version.

For distribution on the largest platforms, mobile applications generally go through the complete cycle of fix, test, upload, wait, publish, monitor for possible improvements, updates, or patches, and/or develop updates or patches. This is generally a time-consuming and multistep process with steps having an indeterminable length. The more time spent in these steps, the longer end users must endure faulty products and poor user experience.

Mobile applications often include a huge bundle of code objects comprising libraries and widgets produced by different development teams. As mobile apps increase in complexity, the difficulty in identifying an issue and sending the issue to a development team having the needed expertise to solve the issue is ever-increasing. This difficulty exacerbates the time-delay problem associated with one-way distribution and deployment of mobile applications on large platforms that do not allow quick updates for a bug fix.

In general, a user may experience a mobile application via a workflow or product flow of the mobile application. A workflow or product flow can include any sequence of steps or actions taken by a user and any associated phases or states of the mobile application. A product flow may also be a sub-flow of a workflow or product flow. Product flows may be defined by a start point at which the mobile application enters the product flow (such as initiating execution of the mobile application) and an end point at which the mobile application exits the product flow (such as terminating execution of the mobile application. The product flow can include the beginning-to-end use of the mobile application, or may be some continuous subset of states and actions leading to transitions between states. Often, an issue is contained within a particular product flow or sub-flow, but other product flows of the mobile application are not affected by the issue.

By dynamically disabling or redirecting a specific problematic product flow for a mobile application instead of disabling the entire application, poor user experiences resulting from the impacted product flow can be prevented without the need to disable other product flows of the mobile application that are not affected by the issue. This is done by using switches at flagged integration points of product flows of a mobile application. Thus, a particular product flow can be disabled without affecting other parts of the application by redirecting the workflow for the mobile application at the flagged integration point of the impacted product flow.

Generally, a flag is a point within a product flow that may be definable by breaks between steps, stages or phases of the flow. The flag points may have switches integrated at that location within the product flow. If the integration is enabled by the switch, the product flow following the switch will execute. If the integration is disabled by the switch, the product flow will not execute. This enabling or disabling is automated by an artificial intelligence (AI) Auto-Healer, which assesses product flow health according to stability rules using artificial intelligence, disables a product flow in response to a poor health status, and/or enables or re-enables a product flow in response to a healthy status.

Thus, aspects of the present disclosure provide techniques for an auto-healing infrastructure which quickly eliminates consumers' poor experience resulting from an issue with a particular product flow, such that a product flow resulting in any poor user experience is quickly replaced with a product flow resulting in a better user experience. This replacement occurs immediately (e.g., in real-time). In the mean-time, an alert may be sent to a product owner of the mobile application, (and/or a development team, engineering team, etc.) about the problem, while providing the product owner an identification, using the flags, of which part of the product flow is resulting in the impacted user experience.

Embodiments of the present disclosure provide many technical improvements with respect to existing mobile applications. For example, by automatically determining a problematic product flow and dynamically replacing the problematic product flow with a functional product flow in real-time, techniques described herein allow mobile applications to continue to function properly despite issues that may arise and that would otherwise result in faulty applications or poor user experiences. Furthermore, by automatically alerting professionals to potential issues with product flows when such potential issues are automatically detected, embodiments of the present disclosure allow for proactive fixing of such issues while minimizing the impact to end users. Additionally, iterative training of a machine learning model to automatically determine potential issues with product flows provides a continually improving system that allows issues to be more accurately and efficiently identified and addressed through self-healing techniques and alerts to professionals capable of fixing issues. Such machine learning techniques may be used, for example, to determine anomalies, trends, shifts, clusters, patterns, or other behavior in health status metrics, and provide alerts or perform other actions in response to such determinations.

Example Computing Environment for Automated Healing for Distributed Mobile Application Deployments FIG. 1 illustrates a computing environment 100 for automated healing for distributed mobile application deployments in which embodiments of the present disclosure can be performed. In FIG. 1, the computing environment 100 comprises a mobile application distribution system 105 including a developer platform 110, an Auto-Healer 140, a mobile application distribution platform 150, and mobile devices 160 and 170.

The developer platform 110 can include various modules related to developing, testing, coding, updating, patching, debugging, submitting, identifying issues, identifying fixes, etc. In the example shown, the developer platform 110 includes a code submitter 115, a patch module 117, and an issue identification module 120. In FIG. 1, the issue identification module 120 includes an alarm module 122, a testing module 124, and a feedback module 126. In response to one of the alarm module 122, testing module 124, and feedback module 126 indicating an issue with a product flow and/or user experience with a mobile application, a patch module 117 can be engaged.

The patch module 117 receives identifications of issues from the issue identification module and generates a patch or fix. Code implementing the fix can be provided to the code submitter 115, which submits the code to a submission acceptor 152 of the mobile application distribution platform 150.

In FIG. 1, the mobile application distribution platform 150 also includes a reviewer 154, an approver 156, and a mobile download host 158. The code implementing the fix is received by the submission acceptor 152, and is then sent to the reviewer 154 once accepted. After a review process is complete, the code implementing the fix is sent to the approver 156 for approval. After approval, the code implementing the fix may be made available at the mobile download host 158 and may be downloadable by the mobile devices 160, 170.

In various situations, issues with a product flow can be determined by metrics associated with the mobile application or device executing the product flow. An issue may also be determined by user feedback received from a user, such as via a mobile device 160, 170. In some embodiments, a testing module 124 can perform testing to determine an issue, such as testing an existing mobile application module against new updates or new integrations with components. The alarm module 122 of various embodiments can receive alerts or alarms, such as from Auto-Healer 140, notifying the developer platform 110 of an issue.

Once an issue is identified and received by the developer platform 110, the process of generating a fix may begin. This process may take a varying amount of time depending on the complexity of the issue and the size and expertise of the development team developing the fix. Additional steps of testing, approval, or other processes may be necessary before the code implementing the fix is developed. One the patch or fix is ready, the code implementing the fix must still undergo a lengthy review and approval process of the mobile application distribution platform 150. This process may take a varying amount of time regardless of the complexity of the issue, the size and expertise of the development team that developed the fix, or the amount of time or resources consumed in developing the mobile application or the fix.

Rather than having to endure poor user experiences for the duration of this time, users of mobile devices, such as mobile device 160, 170 may experience an alternative product flow in the interim until the fix becomes available at a mobile download host 158 by employing the Auto-Healer as disclosed herein.

In FIG. 1, the Auto-Healer 140 includes a metrics server 142, a validator 144, and a change manager 146. In the example shown, the metrics server 142 receives various metrics from the mobile devices 160, 170.

The mobile device 160 of FIG. 1 includes mobile application 165 executing thereon. In the example shown, various metrics are recorded at flags (e.g., implemented via checkpoints included in the code) in a product flow of the mobile application 165. In FIG. 1, the mobile device 170 includes mobile application 175 executing thereon. In the example, metrics are also recorded at flags in a product flow used by the mobile application 175. However, it may be that mobile application 165 and mobile application 175 are different mobile applications having, in part, a common product flow for which metrics are recorded from both mobile devices 160, 170.

Metrics are received for the product flow from the mobile devices 160, 170, for the mobile applications 165, 175 by the metrics server 142. The metrics server stores and/or hosts the metrics to be available so that validator 144 can validate and/or determine the health of product flows associated with incoming metrics. In some cases, the validator may also be used to determine the authenticity or completeness of the incoming metrics. In response to the metrics indicating an issue, such as an anomaly in the metrics, the validator 144 may instruct the change manager 146 to toggle a switch in any mobile applications which may experience the issue. In the example shown, the change manager 146 may toggle a switch of mobile application 165 and/or mobile application 175 to redirect a product flow from one flag to another, or to disable a product flow at a flag. The change manager 146 may also send an alert to the alarm module 122, so that steps may commence at the developer platform 110 to generate and submit a fix. However, the toggling of the switch in the mobile application(s) occurs immediately, so that impact to user experience is minimized.

Example System Using Auto-Healer for Distributed Mobile Application Deployments

Figure 2:
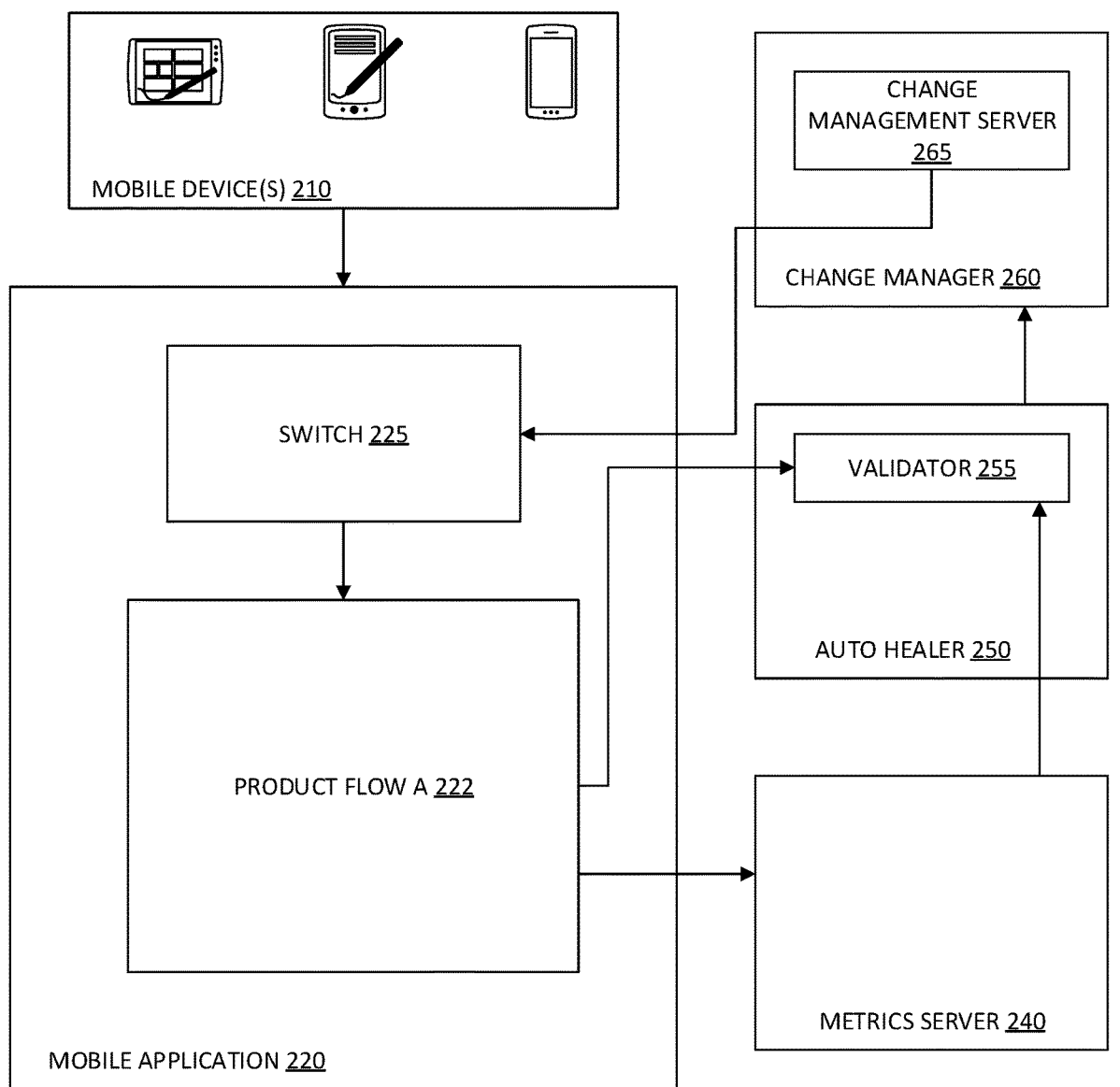
FIG. 2 illustrates an example system using automated healing for distributed mobile application deployments, according to embodiments of the present disclosure.

FIG. 2 illustrates an example system 200 using automated healing for distributed mobile application deployments, according to embodiments of the present disclosure.

In the example of FIG. 2, the system 200 includes one or more mobile devices 210 each running instances of mobile application 220. The mobile application 220 includes a first product flow 222, PRODUCT FLOW A, and a switch 225. The workflow for the mobile application 220 includes one or more flag points in the workflow. Product flows can be defined as the portion of the mobile application workflow between specified flag points. A switch may be present at the flag points.

In the example of FIG. 2, an issue can be determined in PRODUCT FLOW A from metrics provided by the mobile application 220 (such as by PRODUCT FLOW A) to a metrics server 240. The metrics server 240 may provide the metrics to a validator 255 that validates or determines the health of the product flow 222. In some embodiments, the validator may be used to validate product flow 222, including flag points.

If it is determined that the product flow 222 needs to be healed, the Auto-Healer 250 may pass instructions to the change manager 260 to toggle the switch 225 of the mobile application 220. Before the switch is toggled or engaged, the mobile application includes a workflow that continues past the switch 225 to PRODUCT FLOW A. In response to the switch being toggled, the workflow of the mobile application 220 may be altered so that PRODUCT FLOW A is no longer included in the workflow, such as by removing or replacing the product flow 222. In cases, an alternative product flow may be used in place of PRODUCT FLOW A. The alternative product flow may be interchangeable with PRODUCT FLOW A at a first flag point defining the start of PRODUCT FLOW A and at a second flag point defining the end of PRODUCT FLOW A.

In a particular configuration, the switch 225 makes a network call to the change manager 260, upon startup of the mobile application 220, to pull, fetch, or otherwise retrieve a file, such as a Javascript object notation (JSON) file, listing all the switches for features in a given mobile app.

For example, an object file may be of the following form:

```
{
"personalLoansPQ": true,
"dynamicFilters": false,
"purchaseFlow": true,
"landingPageRedesign": true,
"benefitEstimate": true,
...
}
```

In this example, the switch 225 parses this object file into an in-memory map and uses the in-memory map to determine whether to enable and/or disable product flows. For example, product flows may be enabled or disabled in one or more of the following ways: A feature existing on a new slide or screen may be disabled by removing a navigational link. Similarly, a feature may be enabled the by the switch to ensure that the navigational link is visible and active. If a feature is part of a mobile app screen, rather than a separate screen, disabling the feature by the switch may comprise hiding the app screen, or hiding a portion of the view associated with the features. Similarly, the feature may be enabled by the switch by ensuring that the portion of the view is visible and active.

Various product flows are integrated with the application at various switch points and can be singly enabled and disabled with a switch for each point. The points may also include breaks or flags, for defining workflow portions defining product flow or product flow portions which facilitate diagnosis of issues and metric gathering. Turning on the switch will enable the product flow at a flag or break point and turning off the switch will disable the product flow at that flag or break point.

In FIG. 2, whether PRODUCT FLOW A 222 is enabled within the workflow of the mobile application is controlled by the switch 225. The switch 225 in this example is remotely controlled by a change management server, such as change manager 260. In a particular implementation, the switch 225 and change manager 260 communicate using REST API calls. Thus, the change management server 160 can either enable or disable the integration switch 225 of the product flow by impacting the mobile application 220 via API calls.

In the case of no network connection being available, the default state of the switch 225 may be pre-defined in the application during integration of the product flow(s) with the mobile application. In some cases, it may be preferable to include a default state for the switch as being in an "off" state so the feature remains disabled by default and does not interfere with other flows in the application.

In the example of FIG. 2, the change manager 260 receives commands or other input from the Auto-Healer 250. In certain embodiments, the Auto-Healer 250 includes a collection of stability rules. The stability rules may be predefined or defined by a product owner. One or more stability rules may be included for every product flow or portion thereof in the application. The stability rules may define a stability of a product flow. Stability can be an indicator of health or health status. In some cases, an anomaly can be definable in terms of a stability rule and determinable according to a violation of the stability rule.

In FIG. 2 if the stability of PRODUCT FLOW A deviates from a stability rule or set of stability rules defined for it, the Auto-Healer 250 signals the change manager 260 to disable the product flow 222.

In certain implementations, the Auto-Healer 250 may be artificially intelligent such that the Auto-Healer continuously learns from metrics data received from PRODUCT FLOW A, and/or other product flows. In this case, the Auto-Healer may be referred to as an AI Auto-Healer. Using metrics data received from PRODUCT FLOW A and/or other product flows to train and/or fine tune a machine learning model (e.g., an inference model) to predict issues in product flows and/or to predict threshold values for stability rules used to determine potential issues in product flows, such as using supervised and/or unsupervised learning techniques, the functioning of Auto-Healer 250 is improved over time.

In some embodiments a machine learning model is trained to directly predict whether there is a potential issue with a product flow based on metrics data for the product flow, while in other embodiments a machine learning model is trained to output threshold values that indicate acceptable ranges for certain metrics related to a product flow (e.g., based on labeled data indicating metrics values that are associated with product flows indicated by user feedback to be healthy or unhealthy) and these threshold values are used in stability rules to determine whether metrics data indicates a potential issue with a product flow.

In some embodiments, training of a machine learning model is a supervised learning process that involves providing training inputs representing product flows (e.g., metrics values) as inputs to the machine learning model. The machine learning model processes the training inputs (e.g., through its various layers) and outputs predictions (e.g., acceptable ranges for metrics values or indications of whether the product flows may experience issues) with respect to the product flows represented by the inputs. The predictions are compared to known labels associated with the training inputs (e.g., indicating whether the product flows represented by the input values are known to be healthy or unhealthy, such as based on user feedback) to determine the accuracy of the machine learning model, and the machine learning model is iteratively adjusted until one or more conditions are met. For instance, the one or more conditions may relate to an objective function (e.g., a cost function or loss function) for optimizing one or more variables (e.g., prediction accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the machine learning model, such as based on validation data and test data, as is known in the art. Various types of machine learning models may be used, such as a neural network, tree-based model, gradient-boosted tree, regression model, clustering model, and/or the like.

Stability rules (e.g., comprising threshold values that are dynamically determined using a machine learning model as described above) may be used by a validator 255 to validate the health and/or stability of the product flow 222. Additionally, user feedback may be provided through the mobile application based on satisfaction and/or quality. For example, positive feedback may be used to tag results as positive or healthy results, whereas negative feedback may be used to tag results as negative or unhealthy results. The AI Auto-Healer 250 may be trained on such tagged results and associated metrics data received from product flows to improve stability rules associated with the product flows. Alternatively, rather than using stability rules, validator 255 may use a machine learning model directly to determine whether there is a potential issue with a product flow based on metrics data received for the product flow. Machine learning model(s) described herein may be re-trained over time as new user feedback is received with respect to product flows and with respect to predictions output by such machine learning model(s) for continuous improvement. For example, if an alert is provided to a professional indicating a potential issue with a product flow based on a prediction by a machine learning model and the professional provides feedback indicating that there is in fact no issue with the product flow, this feedback may be used to re-train the machine learning model for improved accuracy of subsequent predictions.

In FIG. 2, the metrics server 240 may be an intelligent observability server which collects the metrics and which collects analytics sent from PRODUCT FLOW A 222 across all users of the mobile application. Thus, metrics and analytics can be received by many mobile devices executing the mobile application (or another mobile application having, in part, the same product flow). In some cases, custom set or predefined analytics filters are applied to the data received and the data and/or filtered data is stored in a persistent location, which may be referred to as a metrics server. The persistent storage location may be monitored by the AI Auto-Healer 250 to detect any anomalies in the data.

Figure 3:
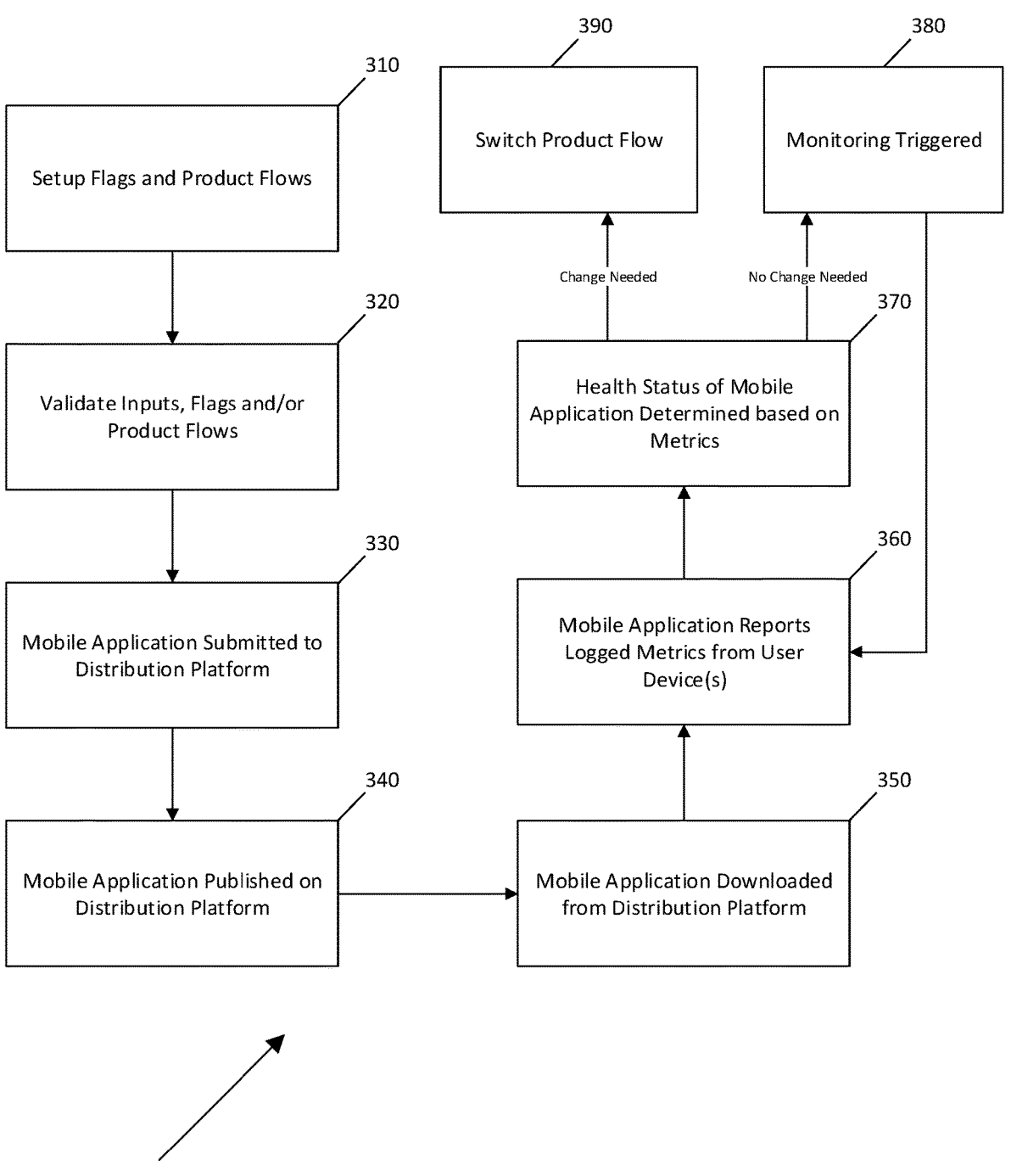
FIG. 3 illustrates an example workflow for automated healing for a distributed mobile application deployment, according to embodiments of the present disclosure.

Example Operations for Automated Healing for a Distributed Mobile Application Deployment FIG. 3 illustrates example operations 300 for automated healing for a distributed mobile application deployment, according to embodiments of the present disclosure. In the example shown, the operations 300 begin at stage 310 where one or more flags and/or product flows are set up. For example, a product flow may include flags at various points of the product flow for assessing various metrics at those points. The metrics may include, for example, information about a mobile device executing the product flow, such as resource usage, battery, temperature, etc., or a timestamp for the break point (which may be used to determine processing time between flags).

In general, a product flow or product subflow can be defined as a series of one or more stages beginning at a stage and ending at a stage. A subflow may be a type of product flow that is a portion of another product flow. In some cases, a number of different subflows can be known for a particular subflow that perform the same or similar functionality as the particular subflow. The different subflows can be initiated at the beginning flag of a particular subflow when the particular subflow is disabled due to a health status issue. The different subflow may also conclude at the same flag as the particular subflow, so that the rest of the product flow of which the particular subflow is a part of is unchanged.

The product owner or an operator may set threshold values in the AI Auto-Healer system when configuring a product flow. Depending on the behavior of the application, the AI Auto-Healer may apply algorithms (e.g., a machine learning model, as described above, or other types of learning algorithms) to update the threshold values to better suit the current behavior of the application. This automatic updating may greatly reduce false alarms triggered by the system.

Next, the operations 300 may proceed to stage 320 where inputs, flags and/or product flows are validated. In various embodiments, an Auto-Healer may receive the inputs, flags, and/or product flows, and a validator verifies that the inputs, flags, and/or product flows or subflows match values for one or more product flows known to the Auto-Healer.

The operations 300 then proceed to stage 330 where a mobile application is submitted to a distribution platform. In various cases, time may be required before the mobile application is reviewed and approved by the distribution platform. Once the mobile application is approved by the distribution platform, the operations 300 may proceed to stage 340 where the mobile application is published on the distribution platform (or platforms).

Once the mobile application is published for distribution, the operations 300 may proceed to stage 350 where the mobile application is downloaded from the distribution platform. In various cases, the mobile application may be downloaded from a user device such as a smart phone, tablet, laptop, etc. In some embodiments, a product flow is shared by multiple mobile applications downloaded by many users, with each mobile application reporting metrics.

Next, the operations 300 may proceed to stage 360 where the mobile application reports logged metrics from the one or more user devices. In some cases, the metrics can be reported from a large number of mobile devices using the mobile application to a metrics server in communication with the Auto-Healer, and the Auto-Healer continuously monitors the metrics server to catch any anomalies. In some cases, the metrics are sent from the mobile application continuously to the metric server in real time. The metrics server may include sophisticated data processing enabling storage and processing huge amounts of data in minimal time.

The metrics systems may include modules for processing or preprocessing the data to store the data in a meaningful way that is easy for other systems to understand and consume. The AI Auto-Healer is a consumer of the metrics data and constantly observes it for outliers or anomalies. In some cases, anomaly or outlier detection occurs with the help of threshold values configured by the product owner. If an outlier is detected, the AI Auto-Healer will trigger a change manager of a change management system to toggle a switch disabling the impacted product flow.

Next, the operations 300 may proceed to stage 370 where a health status of the mobile application is determined based on the metrics. In some applications, the Auto-Healer may monitor the health status of a mobile application product flow or a shared service that is shared by multiple different mobile applications and which is in use by many different user devices executing the mobile applications. The determined health may be based on metrics from any number of such mobile devices. The Auto-Healer can determine whether a change is needed in a product flow based on the determined health using metrics from one or many devices.

In certain embodiments, stability rules are defined for the AI Auto-Healer and used for determining a product flow health status. Each product flow validated by the AI Auto-Healer may have a set of stability rules defined for it. The Auto-Healer of embodiments continuously monitors the data and/or analytics stored at a metrics server. The Auto-Healer ensures that none of the stability rules for a given product flow are broken. The stability rules can track system parameters, product parameters, such as performance delay in loading the experience (which may be determined by measuring the time between timestamps of flags), HTTP status code, server response time, session timeout, analytics events indicating negative user experience (screen heat maps, bounce rate, and other parameters. These parameters may be saved as a json file. An example json file containing example parameters may take the following form:

```
{
    "validHttpResponseCodes": "200",
    "maxNetworkLatency": "300",
    "allowRedirect": false,
    "featureErrorCodesAllowed": "expiredSession,platformError",
    ... }
```

Returning to the operations 300, if it is determined at stage 370 that no change is needed in the product flow, the operations 300 may proceed to stage 380 where monitoring is triggered. In some cases, it may be desired to continuously monitor the health status of the mobile application. In such cases, monitoring will be triggered by the Auto-Healer (or by the mobile application) such that the operations 300 return to stage 360 and the mobile application reports logged metrics from the user devices, including logged metrics resulting from the monitoring triggered at stage 380. The operations 300 may optionally continue in this way any number of times unless or until it is determined that a change is needed in the product flow.

If it is determined at stage 370 that a change is needed in the product flow, the operations 300 may proceed to stage 390 where the product flow is switched. In various examples, the Auto-Healer may instruct the mobile application to toggle a switch disabling or redirecting some or all of the product workflow. In some cases the product workflow may be switched to an alternative product workflow. The alternative product workflow may be known to have a previous result for a health status that is healthier than the product workflow having the issue, outlier, or anomaly, thus improving user experience and reducing downtime for the mobile application.

Thus, the AI Auto-Healer of certain embodiments continuously monitors the metrics server. For a given product flow, once the health or errors logged in the Metrics Server cross a threshold defined by the stability rules of the AI Auto-Healer, the Auto-Healer triggers a flag change via the Change Management Server for that product flow to disable it. Next, a switch, which may be included at the flag point in the Mobile application, receives a latest json file from the Change Management Server. In such embodiments, the switch may parse the flags contained in the json file as a map, and may disable or enable product flow(s) in the mobile application in accordance with the map defined by the json file. From stage 390 where the product workflow is switched, the operations 300 may conclude.

Example Method for Automated Healing for Distributed Mobile Deployments

FIG. 4 illustrates an example method 400 for automated healing for distributed mobile deployments, according to embodiments of the present disclosure.

In FIG. 4, the method 400 begins at stage 410 where a product flow is received at a healing module. Next, the method 400 proceeds to stage 420 where the healing module validates the product flow. For example, the validator may verify that the product flow matches a product flow known to the Auto-Healer, and/or that a set of one or more flags associated with the product flow corresponds to a known set of flags in storage or memory. The healing module may comprise an Auto-Healer, validator, metrics server, change manager and/or other components, or such component may be separate rather than integrated.

Next, the method 400 may continue at stage 430 where a signal is received from one or more mobile devices executing the product flow. By way of example, the product flow may correspond to a feature of an application for which the health may be determined according to metrics taken at a flag at a start of the product flow, at an end of the product flow, in a central part of the product flow. The feature may further be a shared feature of a plurality of applications. The signal sent from the mobile devices may include metrics corresponding to the product flow, device and/or the mobile application being executed. The metrics may be taken at one or more flag points of the product flow.

The method then may continue at stage 440 where the Auto-Healer determines the health status of the product flow based on the metrics. The determination may be made based on metrics taken at the flag points of the product flow and/or metrics located at a metrics server. From stage 440 where the Auto-Healer determines the health status, the method 400 may continue to stage 450 where one or more actions may be performed to heal the product flow. For example, disabling or redirecting a product flow or associated feature. An alert may also be generated and sent to a developer, admin, or host, indicating one or more of the following: that an issue has occurred; an identification of the workflow having the issue; information about the issue; a processing time between a first flag and a second flag; an indication of any other action that was taken; CPU usage; etc. The disabled subflow is disabled in this example because of an issue identified by an outlier or anomaly in the metrics, such as an unusually long amount of processing time between flags. Other anomalies or outliers may be determinable by an AI model trained to recognize outliers from normal metrics for one or more product flows.

Next, the method 400 may proceed to stage 460 where a signal is received from one or more mobile devices executing the healed product flow. In some embodiments, the healed product flow comprises a product flow having a subflow of the product flow disabled.

The method 400 may then proceed to stage 470 where the healed product flow status is verified. For example, additional metrics may be received for the healed product flow from which it may be determined whether the mobile application executing the product flow still includes an impacted workflow having an issue.

The method 400 may then proceed to stage 480 where the Auto-Healer determines whether to perform one or more additional actions based on healed product flow status. For example, if it is determined at stage 470 that the healed product flow status is verified, the one or more additional actions may be providing an alert to a development platform about the actions taken. As another example, if it is determined at stage 470 that the product flow status is unhealthy, the one or more additional actions may include toggling a switch of the product flow, and/or providing an alert to a development platform identifying the issue and identifying any associated flags at a beginning, end, or middle of the product flow. Once it has been determined whether to perform any additional actions and/or any actions have been performed, the method 400 may conclude.

Example Auto-Healer System

Figure 5:
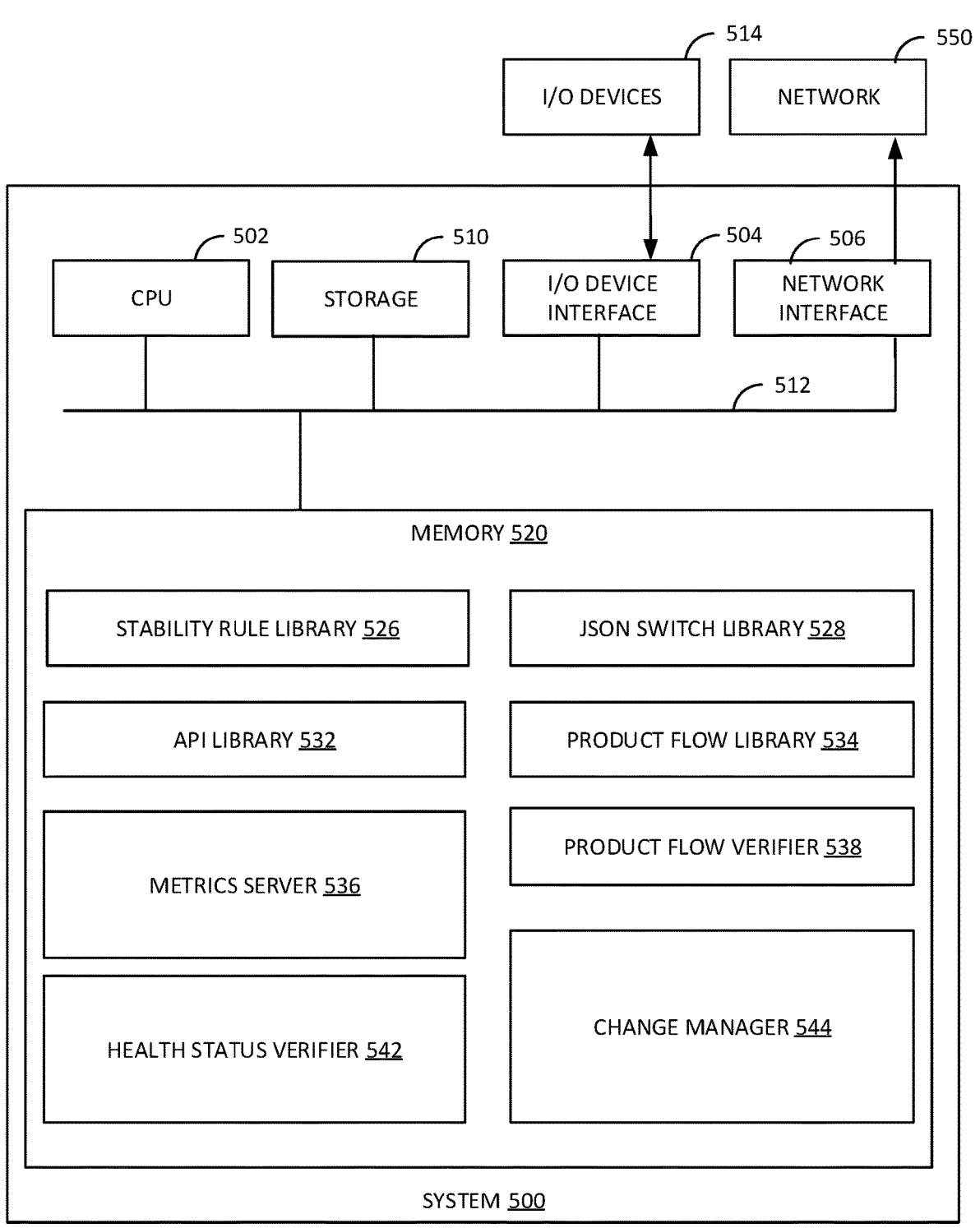
FIG. 5 illustrates an example computing system on which automated healing for distributed mobile application deployments can be performed, according to embodiments of the present disclosure.

FIG. 5 illustrates an example computing system 500 on which methods of automated healing for distributed mobile deployments, such as the examples of FIG. 3-4 can be performed, according to embodiments. In some embodiments, system 500 may act as Auto-Healer, such as the Auto-Healer 140 of FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 550 (which may be a local network, an intranet, the internet, or any other group of computing devices communicatively connected to each other), storage 510, an interconnect 512, and a memory 520. The I/O devices 514 and/or network interface 506 may be used to receive a query in a natural language utterance through a keyboard, microphone, text reader, or the like, or using a chatbot application, and may be used to output a response to the query. The response to the query may be generated based on extracting operators and operands from the natural language utterance. In some embodiments, the storage 520 may be external storage and the network interface 506 is also used to connect to the external storage.

CPU 502 may retrieve and execute programming instructions stored in the memory 508. Similarly, the CPU 502 may retrieve and store application data residing in the storage 510 and/or memory 520. The interconnect 512 transmits programming instructions and application data, among the CPU 502, I/O device interface 504, network interface 506, and memory 520.

CPU 502 is included to be representative of a single CPU, multiple CPUs, a single CPU having multiple processing cores, and the like.

Memory 520 is representative of a volatile memory, such as a random access memory, or a nonvolatile memory, such as nonvolatile random access memory, phase change random access memory, or the like. As shown, memory 520 includes a stability rules library 526, a json switch library 528, an API library 532, a product flow library 534, a metrics server 536, a product flow verifier 538, a health status verifier 542, and a change manager 544.

In various embodiments, the stability rules library can include a set of stability rules for each possible product flow associated with a suite of one or more mobile applications. The set of stability rules can be used to determine one or more thresholds defining a healthy or unhealthy status of respective product flows. The set of stability rules may also be used to determine thresholds for defining outliers or anomalies associated with a product flow. In some embodiments, the stability rules library may be generated and/or fine-tuned using a machine learning model that has been trained based on tags and/or labels, such as tagged or labeled results and/or metrics associated with the product flow.

In various embodiments, the json switch library includes 528, includes json files which may be convertible at a switch into an in-memory map used by the switch to determine whether to enable and/or disable one or more product flows. The API library 532 includes information describing functions or data structures associated with making or receiving API calls from a mobile application and/or the Auto-Healer. For example, API calls may be used by a change manager to affect a change in state of a switch of a mobile application, resulting in a change of product flow.

The metrics server 536 in embodiments receives metrics from flag points of mobile applications and or makes the metrics available for validating the health status of a product flow or determining the health of a product flow. In certain embodiments, a product flow verifier 538 can verify whether data, such a product flow or a configuration of flags for a product flow, matches a known product flow. The product flow verifier 538 can also determine whether the product flow is healthy, either by determining an anomaly or outlier, or by comparing metrics to known metrics for a known product flow. In some cases, a machine learning model can be trained to determine health of a product flow based on input metrics, tags, labels, etc. and/or user feedback.

In FIG. 5 the change manager 544 receives instructions in response to determining that a change in product flow is needed. The change manager 544 may include logic for determining whether to send one or more signals to one or more switches based on the instructions received. In embodiments, the change manager 544 includes modules for toggling switches in a plurality of mobile applications in response to an issue being detected in a product flow used by the applications.

Example Clauses

Aspect 1: A method of healing a product flow for a mobile application, comprising: receiving a product flow at a healing module; receiving, at the healing module, a signal from one or more user devices executing a mobile application including the product flow; determining, by the healing module, a health status of the product flow from the signal; and in response to the health status of the product flow indicating a problem with a component of the mobile application, performing one or more actions by the healing module to heal the product flow.

Aspect 2: The method of Aspect 1, wherein the healing module determines a subflow of the product flow related to the component of the mobile application and heals the product flow by redirecting the product flow from the subflow to a different subflow for the component.

Aspect 3: The method of any of Aspects 1-2, wherein the product flow includes one or more flag points having analytics logging; and the component is disabled at a flag point of the one or more flag points in response to the health status of the product flow indicating a problem related to the flag point.

Aspect 4: The method of any of Aspects 1-3, wherein the mobile application is reviewed by and published on a mobile application distribution platform.

Aspect 5: The method of any of Aspects 1-4, further comprising receiving one or more threshold values during configuration of the product flow and updating the threshold values based on the signal received from the mobile application.

Aspect 6: The method of any of Aspects 1-5, wherein the healing module comprises a collection of stability rules for the product flow.

Aspect 7: The method of any of Aspects 1-6, wherein the product flow is one of a plurality of product flows, the signal is from a plurality of mobile devices executing a plurality of mobile applications including the plurality of product flows, and the method further comprises determining a health status of the plurality of product flows from the signal.

Aspect 8: The method of any of Aspects 1-7, wherein the signal comprises real-time metrics for the plurality of mobile applications, and determining the health status of the plurality of product flows comprises detecting an anomaly in the real-time metrics.

Aspect 9: The method of any of Aspects 1-8, further comprising generating an alert in response to the health status of the product flow indicating the problem.

Aspect 10: A non-transitory computer readable storage medium comprising instructions, that when executed by one or more processors of a computing system, cause the computing system to: receive a product flow at a healing module; receive, at the healing module, a signal from one or more user devices executing a mobile application including the product flow; determine, by the healing module, a health status of the product flow from the signal; in response to the health status of the product flow indicating a problem with a component of the mobile application, perform one or more actions by the healing module to heal the product flow.

Aspect 11: The non-transitory computer readable storage medium of Aspect 10, wherein the healing module determines a subflow of the product flow related to the component of the mobile application and heals the product flow by redirecting the product flow from the subflow to a different subflow for the component.

Aspect 12: The non-transitory computer readable storage medium of any of Aspects 10-11, wherein the product flow includes one or more flag points having analytics logging; and the component is disabled at a flag point of the one or more flag points in response to the health status of the product flow indicating a problem related to the flag point.

Aspect 13: The non-transitory computer readable storage medium of any of Aspects 10-12, wherein the mobile application is reviewed by and published on a mobile application distribution platform.

Aspect 14: The non-transitory computer readable storage medium of any of Aspects 10-13, The non-transitory computer readable storage medium of claim 10, wherein the instructions further cause the system to: receive one or more threshold values during configuration of the product flow and update the threshold values based on the signal received from the mobile application.

Aspect 15: The non-transitory computer readable storage medium of any of Aspects 10-14, wherein the healing module comprises a collection of stability rules for the product flow.

Aspect 16: The non-transitory computer readable storage medium of any of Aspects 10-15, wherein the product flow is a product flow of a plurality of product flows; the signal is from a plurality of mobile devices executing a plurality of mobile applications including the plurality of product flows; and the instructions further cause the system to determine a health status of the plurality of product flows from the signal.

Aspect 17: The non-transitory computer readable storage medium of any of Aspects 10-16, wherein the signal comprises real-time metrics for the plurality of mobile applications, and determining the health status of the plurality of product flows comprises detecting an anomaly in the real-time metrics.

Aspect 18: The non-transitory computer readable storage medium of any of Aspects 10-17, wherein the instructions further cause the system to generate an alert in response to the health status of the product flow indicating a problem.

Aspect 19: A system comprising: a mobile application distribution platform; a healing module; and a user device in networked communication with the healing module, the user device executing a mobile application received from the mobile application distribution platform, and the mobile application including a product flow; wherein the healing module comprises a memory having executable instructions stored thereon; and one or more processors configured to execute the executable instructions to cause the healing module to: receive the product flow; receive a signal from one or more user devices executing a mobile application including the product flow; determine a health status of the product flow from the signal; and in response to the health status of the product flow indicating a problem with a component of the mobile application, perform one or more actions to heal the product flow.

The system of Aspect 19, wherein the user device is a user device of a plurality of user devices executing a plurality of mobile applications received from a plurality of platforms, the plurality of mobile applications includes a plurality of product flows validated by the healing module, and the healing module receives one or more signals from the plurality of user devices.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of healing a product flow for a mobile application, comprising:

executing, by one or more user devices, a mobile application including a product flow, wherein the product flow includes a flag point comprising a switch configured to enable or disable a corresponding application component;

determining, by a healing module, a health status of the product flow based on evaluating resource utilization for the one or more user devices executing the mobile application using a machine learning model trained through an iterative supervised learning process using training data comprising past resource utilization values associated with ground truth labels;

in response to the health status of the product flow indicating a problem with the corresponding application component, producing, by the healing module, a healed product flow by disabling the corresponding application component using the switch; and executing, by one or more user devices, the mobile application with the healed product flow.

2. The method of claim 1, wherein the healing module determines a subflow of the product flow related to the corresponding application component, and wherein the producing of the healed product flow further comprises redirecting the product flow from the subflow to a different subflow.

3. The method of claim 1, wherein the flag point has analytics logging.

4. The method of claim 1, wherein the mobile application is reviewed by and published on a mobile application distribution platform.

5. The method of claim 1, further comprising receiving one or more threshold values during configuration of the product flow and updating the threshold values based on the health status of the product flow.

6. The method of claim 1, wherein the healing module comprises a collection of stability rules for the product flow.

7. The method of claim 1, wherein the product flow is one of a plurality of product flows, and wherein the method further comprises determining a health status of the plurality of product flows based on evaluating corresponding resource utilization for a plurality of user devices executing the mobile application.

8. The method of claim 7, wherein determining the health status of the plurality of product flows comprises detecting an anomaly in the corresponding resource utilization.

9. The method of claim 1, further comprising generating an alert in response to the health status of the product flow indicating the problem.

10. A non-transitory computer readable storage medium comprising instructions, that when executed by one or more processors of a computing system, cause the computing system to:

execute, by one or more user devices, a mobile application including a product flow, wherein the product flow includes a flag point comprising a switch configured to enable or disable a corresponding application component;

determine, by a healing module, a health status of the product flow based on evaluating resource utilization for the one or more user devices executing the mobile application using a machine learning model trained through an iterative supervised learning process using training data comprising past resource utilization values associated with ground truth labels;

in response to the health status of the product flow indicating a problem with the corresponding application component, produce, by the healing module, a healed product flow by disabling the corresponding application feature using the switch; and execute, by one or more user devices, the mobile application with the healed product flow.

11. The non-transitory computer readable storage medium of claim 10, wherein the healing module determines a subflow of the product flow related to the corresponding application component, and wherein the producing of the healed product flow further comprises redirecting the product flow from the subflow to a different subflow.

12. The non-transitory computer readable storage medium of claim 10, wherein the flag point has analytics logging.

13. The non-transitory computer readable storage medium of claim 10, wherein the mobile application is reviewed by and published on a mobile application distribution platform.

14. The non-transitory computer readable storage medium of claim 10, wherein the instructions further cause the system to:

receive one or more threshold values during configuration of the product flow and update the threshold values based on the health status of the product flow.

15. The non-transitory computer readable storage medium of claim 10, wherein the healing module comprises a collection of stability rules for the product flow.

16. The non-transitory computer readable storage medium of claim 10, wherein the product flow is a product flow of a plurality of product flows; and the instructions further cause the system to determine a health status of the plurality of product flows based on evaluating corresponding resource utilization for a plurality of user devices executing the mobile application.

17. The non-transitory computer readable storage medium of claim 16, wherein determining the health status of the plurality of product flows comprises detecting an anomaly in the corresponding resource utilization.

18. The non-transitory computer readable storage medium of claim 10, wherein the instructions further cause the system to generate an alert in response to the health status of the product flow indicating a problem.

19. A system comprising:

a mobile application distribution platform;

a healing module; and a user device in networked communication with the healing module, the user device executing a mobile application received from the mobile application distribution platform, and the mobile application including a product flow, wherein the product flow includes a flag point comprising a switch configured to enable or disable a corresponding application component; and wherein:

the healing module comprises a memory having executable instructions stored thereon; and one or more processors configured to execute the executable instructions to cause the healing module to:

determine a health status of the product flow based on evaluating resource utilization for the user device executing the mobile application using a machine learning model trained through an iterative supervised learning process using training data comprising past resource utilization values associated with ground truth labels; and in response to the health status of the product flow indicating a problem with the corresponding application component, produce a healed product flow by disabling the corresponding application feature using the switch, wherein the user device executes the mobile application with the healed product flow.

20. The system of claim 19, wherein the user device is a user device of a plurality of user devices executing a plurality of mobile applications received from a plurality of platforms, the plurality of mobile applications includes a plurality of product flows validated by the healing module, and the healing module receives one or more signals from the plurality of user devices.

\* \* \* \* \*